United States Patent Office 3,455,953
Patented July 15, 1969

3,455,953
1,3,2-DIOXATHIANES
Quentin E. Thompson, Belleville, Ill., assignor to Monsanto Company, St. Louis, Mo., a corporation of Delaware
No Drawing. Original application Dec. 28, 1964, Ser. No. 421,606. Divided and this application Jan. 31, 1968, Ser. No. 718,277
Int. Cl. C07d 89/18
U.S. Cl. 260—327   8 Claims

ABSTRACT OF THE DISCLOSURE

Compounds useful as extreme pressure agents in mineral oil and as curing agents for the vulcanization of sulfur vulcanizable rubber which are represented by the formula

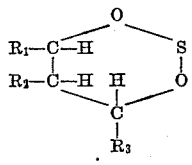

wherein $R_1$, $R_2$ and $R_3$ are each selected from the group consisting of hydrogen alkyl radicals having from 1 through 16 carbon atoms and alkenyl radicals having from 3 through 17 carbon atoms.

---

This is a division of application Ser. No. 421,606, filed Dec. 28, 1964.

This invention relates to novel cyclic and acylic sulfoxylate esters of bivalent sulfur and to their method of preparation.

The novel compounds of this invention are represented by the structures (I) 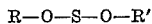

(II) 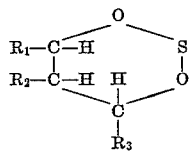

wherein R and R' are each selected from the group consisting of alkyl radicals and substituted alkyl radicals having from 3 to 20 carbon atoms, alkenyl radicals having from 3 to 20 carbon atoms and cycloalkyl radicals having from 6 to 30 carbon atoms and wherein $R_1$, $R_2$ and $R_3$ are selected from the group consisting of hydrogen, alkyl radicals having from 1 to 17 carbon atoms and alkenyl radicals having from 3 to 17 carbon atoms.

The compounds of this invention are prepared in the case of compounds of structure I by reacting monohydric aliphatic alcohols, and in the case of structure II by reacting dihydric aliphatic alcohols in an inert diluent with sulfur dichloride in the presence of at least 2 mols of tertiary amine per mol of sulfur monochloride. In carrying out the process of this invention to produce acyclic esters the reactants can be combined in several ways. For instance, sulfur dichloride can be added concurrently with a tertiary amine, each from a separate container, to a reaction zone containing an alcohol and a diluent; sulfur dichloride can be added concurrently with an alcohol, from different containers, to a reaction zone containing a tertiary amine; sulfur dichloride can be added concurrently with an alcohol in a mixture with a tertiary amine, from separate containers, to a reaction zone containing a diluent, and preferably sulfur dichloride is added to a reactor containing an alcohol and a tertiary amine in admixture with an inert liquid diluent. In producing cyclic esters according to the method of this invention sulfur dichloride and a dihydric alcohol are each first combined with an inert diluent, after which a tertiary amine is combined with the dihydric alcohol-diluent mixture. The mixture of sulfur dichloride and diluent is then added concurrently with the mixture of dihydric alcohol, amine and diluent to a reaction zone. Alternatively, sulfur dichloride can be added concurrently with a dihydric alcohols, each from separate containers, to a reaction zone containing a tertiary amine in admixture with an inert liquid diluent.

When employing any of the above-mentioned methods of combining the reactants, the reactants must be added in a manner which at all times provides in the reaction zone the molar ratio of tertiary amine to sulfur dichloride of about 2:1, respectively, and for the best results in obtaining the cyclic ester the reactants must be added in a manner which provides in the reaction zone substantially equimolar concentrations of dihydric alcohol and sulfur dichloride neither of which is present in greater concentration than .002 molar. The reaction of the alcohol with sulfur dichloride takes place at temperatures in the range of about —100° C. to about 30° C. and preferably from —95° C. to —60° C. To produce acyclic esters of this invention it is usually more convenient to add the sulfur dichloride stepwise, with moderate agitation, to the alcohol-amine mixture. Although the reaction takes place nearly instantaneously, in both cyclic and acyclic production, it is sometimes advisable to agitate the reaction mixture during the addition of sulfur dichloride and for a short time thereafter to assure completion of the reaction.

When a combination of alcohols is employed simultaneously in the method of this invention to produce acyclic esters, there is produced a composition containing sulfoxylate esters which have different R and R' groups. A composition thus produced also has, in varying amounts, esters in which R and R' are the same. For example, when both ethyl alcohol and butyl alcohol together are reacted with sulfur dichloride according to the method of this invention, the esters produced by the reaction are ethyl-butyl sulfoxylate, diethyl sulfoxylate and dibutyl sulfoxylate.

The tertiary amine used in the process of this invention functions as an acid acceptor in the reaction mixture and forms a hydrochloride salt by combining with hydrogen chloride, which is formed as a by-product in the reaction of alcohol and sulfur dichloride. At the completion of the reaction, removal of the amine salt is conveniently accomplished by extraction with water, preferably ice water. The water-soluble amine salt separates from the water-insoluble sulfoxylate ester and is decanted with the aqueous phase of the mixture.

In the preferred method of this invention to produce acyclic esters, an inert or neutral diluent liquid is employed as a reaction medium and as an aid in the addition of the reactants to the reaction vessel. Preferably, the tertiary amine and alcohol are combined in a diluent before sulfur dichloride is combined therewith. It is also convenient to have the sulfur dichloride combined with an inert diluent which can be the same or a different diluent than is used with the alcohol-amine mixture. In the case of producing cyclic esters, it is necessary to employ an inert diluent to achieve the optimum molar concentration of alcohol in the reaction zone.

Typical examples of diluents useful in the method of this invention are chlorinated hydrocarbons, such as methyl chloride and dichloromethane (methylene chloride), also carbon tetrachloride and trichloromethane (chloroform) can be used when the process of this invention is carried out at temperatures above their crystallization point. Other diluents useful in the method of this invention are aliphatic and cycloaliphatic ethers, such as diethyl ether, tetrahydrofuran, diisopropyl ether and dimethyl ether. Also, tertiary amine can be used as a diluent by adding an amount in excess of that required to combine with all of the hydrogen chloride produced by the reaction. Typical amines which can be used as a diluent are trimethylamine and triethylamine. Similarly, an excess of the alcohol being employed in the reaction to produce the acyclic esters can be used as a diluent. Excess tertiary amine or alcohol can be employed only when their physical properties, such as boiling point and melting point, do not render them inconvenient for use as a diluent. An inert diluent is employed to render the reaction mixture stirrable during and after completion of the reaction in the case of producing acyclic esters and additionally in the case of cyclic ester product to provide the preferred reactant concentrations in the reaction zone. The amount of diluent will vary depending upon the characteristics of the particular alcohol employed and the solubility of the amine hydrochloride produced. When a diluent is employed in the method of this invention, it is selected so that its volatility will be sufficiently different from that of the desired ester to ensure easy separation of the two materials. The crude esters depending on their physical properties are purified by conventional techniques such as distillation, crystallization or solvent extraction.

Monohydric alcohols which can be employed in the method of this invention include primary and secondary aliphatic alcohols having from 1 to 20 carbon atoms and cycloaliphatic alcohols having from 6 to 30 carbon atoms. Dihydric alcohols which can be employed in the method of this invention are 1,3-aliphatic diols having from 3 to 20 carbon atoms and having the hydroxyl groups attached to different carbon atoms separated from each other by one carbon atom. Said alcohols can contain other substituents in the molecule such as alkoxy, sulfide, nitro groups, halogens and unsaturated carbon to carbon bonding providing the substituent is attached to a different carbon atom than is the hydroxyl group.

As used herein the term 1,3-aliphatic diol is intended to mean aliphatic alcohols, unsaturated aliphatic alcohols and cycloaliphatic alcohols containing two hydroxyl groups, each group attached to carbon atoms separated by not more than one carbon atom of the aliphatic compound.

As used in the specification and claims cycloalkyl radical is intended to mean aliphatic carbocyclic radicals having one or more rings or fused ring structures wherein the ring carbon atom may contain branch chain alkyl radicals having from 1 to 10 carbon atoms.

Tertiary amines suitable for use in the method of this invention are those capable of forming amine salts with hydrogen chloride. Aliphatic, heterocyclic and aromatic amines are capable of utilization. Typical amines are trialkylamines wherein the alkyl radicals have from 1 to 12 carbon atoms, examples of which are trimethylamine, triethylamine, tripropylamine, tributylamine, tri-n-decylamine, dimethylethylamine, dipropylbutylamine and dimethylcyclohexylamine; heterocyclic amines, examples of which are pyridine. quinoline, pyrimidine, N-methyl piperidine and N-ethyl morpholine; and aromatic amines, examples of which are N,N′-diethylaniline, N,N′-dimethylaniline and N-methyl diphenylamine. As a practical matter, a small amount in excess of the stoichiometric amount required can be employed to assure that all of the hydrogen chloride formed goes to the hydrochloride salt and thereby prevent any reaction of the ester with hydrogen chloride. Larger excesses are not harmful but generally are economically disadvantageous.

The following examples illustrate specific embodiments of this invention but are not to be construed as limiting its scope. Compositions are given as percent by weight. Parts are parts by weight. The reactor employed in all of the following examples was equipped with means for determining temperature of the reactants, means for agitating the contents, and means for the additional and removal of the reactants and products.

I. Acylic sulfoxylate esters

Example 1

Into a suitable reaction vessel there was charged 38.6 parts of cholesterol, 10.2 parts of trimethylamine and 300 ml. of methylene chloride. After cooling the mixture to −90° C., 5.1 parts of sulfur dichloride in 30 ml. of methylene chloride was added dropwise over a period of from 2 to 3 hours while maintaining rapid stirring. After the completion of the reaction, the reaction mixture was washed with 400 ml. of water removing the amine hydrochloride. The product, dicholesteryl sulfoxylate, precipitated from the diluent and was purified by 3 successive recrystallizations from methylene chloride, yielding 6.7 parts of product, M.P. 180–182° C., which was subjected to elemental analysis, the results of which are presented below.

Calculated for $C_{54}H_{90}O_2S$: C, 80.73%; H, 11.29%; S, 3.99%. Found: C, 80.71%; H, 11.15%; S, 3.86%.

Example 2

Into a suitable reaction vessel there was charged 90 parts of butyl alcohol, 102 parts of triethylamine and 370 ml. of dry methylene chloride. After cooling the reaction mixture to −80° C. and with rapid stirring, 51.5 parts of sulfur dichloride in 100 ml. of dry methylene chloride was added dropwise over a period of 2 hours. After completion of the reaction, the reaction mixture was allowed to warm to 0° C. and divided into two layers by the addition of 400 ml. of water. The organic layer was separated, dried and subjected to reduced pressure thus removing the diluent. The product, dibutyl sulfoxylate, was removed by vacuum fractionation as a liquid, B.P. 57° C. (2. mm. Hg) having an index of refraction, $n_D^{25}$, of 1.4355.

Using the procedure of Example 2, other sulfoxylate esters were produced, and characterized. These compounds are listed in Table I below.

TABLE I

| Ex. No. | Reactants | | | | | | Product | | | | | | |
|---|---|---|---|---|---|---|---|---|---|---|---|---|---|
| | Alcohol | Parts | Parts $SCl_2$, (g.) | Amine | Parts | Diluent | Ml. | Calc. for found | Percent C | Percent H | Percent S | B.P., °C. | Mm. Hg. | $n_D^{25}$ |
| 3 | n-Propyl | 60 | 51.5 | Triethylamine | 102 | Methylene chloride | 470 | $C_6H_{14}O_2S$ | 47.96 / 47.74 | 9.37 / 9.54 | 21.34 / 21.15 | 43 | 7 | 1.4270 |
| 4 | Isopropyl | 60 | 51.5 | do | 102 | do | 470 | $C_6H_{14}O_2S$ | 47.96 / 47.74 | 9.37 / 9.38 | 21.34 / 21.23 | 55 | 30 | 1.4170 |
| 5 | n-Pentyl | 88.1 | 51.5 | do | 102 | do | 470 | $C_{10}H_{22}O_2S$ | 58.20 / 58.12 | 11.23 / 11.28 | 15.54 / 15.63 | 67 | 0.3 | 1.4374 |

II. Cyclic sulfoxylate esters

Example 6

Into a first container there was placed 45 parts of 1,3-butanediol and 102 parts of triethylamine which were diluted to a volume of 250 ml. with methylene chloride. To a second container there was added 51.5 parts of sulfur dichloride and sufficient methylene dichloride to provide a total volume of 250 ml. The contents of the two containers were added slowly and concurrently to a suitable reactor containing 600 ml. of methylene chloride cooled to −90° C. The reactants were added over a period of 2 to 3 hours while maintaining rapid stirring. After completion of the additions the reaction mixture was allowed to warm to 0° C. and was divided into layers by the addition of 400 ml. of water. The organic layer was separated, dried and subjected to reduced pressure to remove the diluent. A light tan oil remained after removal of the diluent which was purified by vacuum distillation yielding 6-methyl-1,3,2-dioxathiane, B.P. 36° C. (4 mm. Hg).

Example 7

Using the procedure of Example 6, 71.3 parts of 2,2,4-trimethyl-1,3-pentanediol and 102 parts of triethylamine were caused to react with 51.5 parts of sulfur dichloride using methylene chloride as a diluent. Vacuum distillation of the product yielded 4-isopropyl-5,5-dimethyl-1,3,2-dioxathiane, boiling point, 31.5–32° C. (0.25 mm. Hg) and having an index of refraction, $n_D^{25}$ of 1.4692. The product was subjected to elemental analysis, the results of which are represented below.

Calculated for $C_8H_{16}O_2S$: C, 54.50%; H, 9.15%; S, 18.19%. Found: C, 54.14%; H, 9.10%; S, 17.80%.

It is interesting to note that while the known homologs of the acyclic compounds of this invention, dimethyl and diethyl sulfoxylate, are volatile lacrimators having no known use, the instant novel compounds are tractable, stable and useful. The differences in properties of the novel compounds of this invention from those of the compounds of the prior art are wholly unexpected in view of the continuity of properties usually found in a homologous series.

Novel compounds of this invention are useful as curing agents for the vulcanization of sulfur vulcanizable rubber and also as additives to increase the lubricity of mineral oils as demonstrated by the data Table II below. The data were obtained on a Shell Four-Ball Extreme Pressure Testing machine using steel-on-steel balls, a rotational speed of 1730 r.p.m., a temperature of 25° C. and kilogram loads as indicated in Table II below. The duration of the test was one minute at each load on fresh balls. The control lubricant employed was SAE grade 90 mineral oil. The compound of this invention was added to the mineral oil in an amount sufficient to provide a final composition containing 0.80% sulfur by weight.

TABLE II

| Compound | Scar diameter, mm. | |
|---|---|---|
| | 100 kg. load | 150 kg. load |
| 6-methyl-1,3,2-dioxathiane | 1.871 | 2.308 |
| Control | Seizure | Seizure |

In addition to the alcohols employed in the foregoing example, other monohydric alcohols can be used to prepared compounds of this invention; for example, aliphatic alcohols such as alkyl alcohols, methyl alcohol, ethyl alcohol, hexyl alcohol, octyl alcohol (sec.- and iso-), diisobutyl alcohol, capryl alcohol, nonyl alcohol, diisobutylcarbinol; alkenyl alcohol wherein the unsaturated carbon atoms and hydroxyl containing carbon atoms are separated from each other by at least one carbon atom, such as butenyl alcohol, pentenyl alcohols (n- and sec.-), hexenyl alcohols (n- and sec.-), octenyl alcohol (n- and sec.-), diisobutenyl alcohol (n- and iso-), nonenyl alcohols; cycloaliphatic alcohols such as cyclopentyl, alkylated-cyclopentyl, alkylated-cyclohexyl alcohols, e.g., mono- and polymethylcyclopentyl alcohols, mono- and polymethylcyclohexyl alcohols, mono- and polyethylcyclohexyl alcohols, mono- and polyisopropylcyclohexyl alcohols, mono- and polytert.-amylcyclohexyl alcohols, n-octylcyclohexyl alcohol, diisobutylcyclohexyl alcohol, cholestan-3α-ol, 3,5-cyclo-cholestan-6β-ol, 7-cholesten-3β-ol, 7,8-dihydroergosterol, 24-iso-5-ergosten-3β-ol and tetrahydrostigmasterol.

In addition to the 1,3-diols employed in the foregoing examples other dihydric alcohols can be used to prepare compounds of this invention, for example, 1,3-pentanediol, 2,4-pentanediol, 3,5-octanediol, 1,3-octanediol, 2-4-octanediol, 1,3-decanediol, 3,5-decanediol, 1,3-nonanediol, 3,5-nonanediol, 1,3-hexanediol, 3,5-hexanediol, 1,3-heptanediol, 1,3-octadecanediol, 3,5-octadecanediol, 1,3-tridecanediol and 3,5-tridecanediol.

In similar manner as that described in the examples given above, other compounds of this invention can be prepared, for example, dihexyl sulfoxylate, dicyclohexyl sulfoxylate, dioctyl sulfoxylate, dioctadecyl sulfoxylate, didecyl sulfoxylate, dinonyl sulfoxylate, 6-butyl-1,3,2-dioxathiane, 6-ethyl-1,3,2-dioxathiane, 5-butyl-1,3,2-dioxathiane, 4,5,6-trimethyl-1,3,2 - dioxathiane, 5,5 - dimethyl-1,3,2-dioxathiane, 5,5-dibutyl - 1,3,2 - dioxathiane, 5 - (1-pentyl)-1,3,2-dioxathiane, 5-(1 - butenyl) - 1,3,2 - dioxathiane, 5-pentadecyl-1,3,2-dioxathiane, and 4,5-diethyl-1,3,2-dioxathiane.

While this invention has been described with respect to various specific examples and embodiments, it is understood that the invention is not limited thereto and that it can be variously practiced within the scope of the following claims.

The embodiments of the invention in which an exclusive property or privilege is claimed are defined as follows:

1. A compound represented by the structure

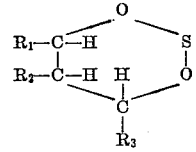

wherein $R_1$, $R_2$ and $R_3$ are each selected from the group consisting of hydrogen, alkyl radicals having from 1 to 17 carbon atoms and alkenyl radicals having from 3 to 17 carbon atoms.

2. 1,3,2-dioxathiane.
3. 6-methyl-1,3,2-dioxathiane.
4. 5,5-dimethyl-1,3,2-dioxathiane.
5. 4,5-diethyl-1,3,2-dioxathiane.
6. 4-isopropyl-5,5-dimethyl-1,3,2-dioxathiane.
7. The method of producing a compound of claim 1 which comprises reacting in substantially equimolar amounts a 1,3-dihydric aliphatic alcohol with sulfur dichloride in the presence of at least 2 mols of tertiary amine per mol of sulfur dichloride in an inert diluent wherein the molar concentration of each of said sulfur dichloride and dihydric alcohol is not greater than about .002 molar.
8. The method of making 6-methyl-1,3,2-dioxathiane which comprises reacting in substantially equimolar amounts 1,3-butanediol with sulfur dichloride in the presence of at least 2 mols of tertiary amine per mol of sulfur dichloride in an inert diluent wherein the molar concentration of each of said butanediol and sulfur dichloride is not greater than about .002 molar.

References Cited

UNITED STATES PATENTS 3,357,993   12/1967   Thompson _____ 260—327

HENRY R. JILES, Primary Examiner

C. M. SHURKO, Assistant Examiner

U.S. Cl. X.R.

252—48.2, 64; 260—79.5, 397.5, 456, 775